United States Patent
Oowaki et al.

(10) Patent No.: US 9,902,828 B2
(45) Date of Patent: Feb. 27, 2018

(54) HIGH-DENSITY POLYETHYLENE MIXED RESIN PARTICLES, COMPOSITE RESIN PARTICLES, FOAMED PARTICLES AND FOAMED MOLDED BODY

(71) Applicant: SEKISUI PLASTICS CO., LTD., Osaka (JP)

(72) Inventors: Hiroki Oowaki, Shiga (JP); Yuichi Gondoh, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 15/111,969

(22) PCT Filed: Mar. 5, 2015

(86) PCT No.: PCT/JP2015/056527
§ 371 (c)(1),
(2) Date: Jul. 15, 2016

(87) PCT Pub. No.: WO2015/146529
PCT Pub. Date: Oct. 1, 2015

(65) Prior Publication Data
US 2016/0340489 A1    Nov. 24, 2016

(30) Foreign Application Priority Data

Mar. 28, 2014   (JP) .................. 2014-069591

(51) Int. Cl.
| | |
|---|---|
| *C08J 9/18* | (2006.01) |
| *C08J 9/00* | (2006.01) |
| *C08J 9/14* | (2006.01) |
| *C08J 9/232* | (2006.01) |
| *C08F 255/02* | (2006.01) |
| *C08F 285/00* | (2006.01) |
| *C08L 23/06* | (2006.01) |
| *C08L 25/06* | (2006.01) |

(52) U.S. Cl.
CPC .............. *C08J 9/18* (2013.01); *C08F 255/02* (2013.01); *C08F 285/00* (2013.01); *C08J 9/0014* (2013.01); *C08J 9/0019* (2013.01); *C08J 9/0023* (2013.01); *C08J 9/0028* (2013.01); *C08J 9/0061* (2013.01); *C08J 9/141* (2013.01); *C08J 9/232* (2013.01); *C08L 23/06* (2013.01); *C08L 25/06* (2013.01); *C08J 2203/14* (2013.01); *C08J 2205/052* (2013.01); *C08J 2325/06* (2013.01); *C08J 2423/06* (2013.01); *C08J 2423/08* (2013.01); *C08J 2431/02* (2013.01); *C08J 2431/04* (2013.01); *C08J 2433/04* (2013.01); *C08J 2433/08* (2013.01)

(58) Field of Classification Search
CPC . C08J 9/15; C08J 9/0019; C08J 9/0023; C08J 9/0061; C08J 9/141; C08J 9/232; C08J 9/0028; C08J 9/0014; C08J 2433/08; C08J 2203/14; C08J 2205/052; C08J 2325/06; C08J 2423/06; C08J 2423/08; C08J 2433/04; C08J 2431/02; C08J 2431/04
See application file for complete search history.

(56) References Cited

U.S. PATENT DOCUMENTS

| | | |
|---|---|---|
| 7,298,156 B2 | 11/2007 | Okuda et al. |
| 2005/0151551 A1 | 7/2005 | Okuda et al. |
| 2008/0045406 A1* | 2/2008 | McKay et al. .......... C08F 10/02 502/150 |
| 2009/0186954 A1 | 7/2009 | Okamura et al. |
| 2010/0087607 A1* | 4/2010 | Mihan et al. .......... C07F 15/025 526/126 |
| 2011/0090568 A1* | 4/2011 | Hamamoto et al. ... A61K 8/895 359/599 |
| 2013/0065977 A1 | 3/2013 | Yasutaka et al. |
| 2013/0172500 A1* | 7/2013 | Morrison et al. ..... C08F 210/16 526/172 |

FOREIGN PATENT DOCUMENTS

| | | |
|---|---|---|
| EP | 1607437 A1 | 12/2005 |
| JP | S59-003487 B2 | 1/1984 |
| JP | H01-284536 A | 11/1989 |

(Continued)

OTHER PUBLICATIONS

International Search Report issued with respect to application No. PCT/JP2015/056527, dated Jun. 9, 2015.

(Continued)

*Primary Examiner* — Nathan M Nutter
(74) *Attorney, Agent, or Firm* — Greenblum & Bernstein, P.L.C.

(57) ABSTRACT

High-density polyethylene mixed resin particles used as seed particles during seed polymerization, wherein said seed particles contain a mixed resin of 100 parts by weight of high-density polyethylene and 20 to 100 parts by weight of an ethylene copolymer; said high-density polyethylene has a density of 935 to 960 kg/m$^3$ and a softening temperature of 115 to 130° C.; said ethylene copolymer is a copolymer of an ester-based monomer selected from an acrylic acid alkyl ester and an aliphatic saturated monocarboxylic acid vinyl, and etylene, contains 1 to 20% by weight of an ester-based monomer-derived component, and has a softening temperature of 75 to 110° C.; said acrylic acid alkyl ester is selected from methyl acrylate and ethyl acrylate; and said aliphatic saturated monocarboxylic acid vinyl is selected from vinyl acetate and vinyl propionate.

8 Claims, 1 Drawing Sheet

(56) References Cited

FOREIGN PATENT DOCUMENTS

| | | |
|---|---|---|
| JP | 06-249915 A | 9/1994 |
| JP | H07-179647 A | 7/1995 |
| JP | H08-059754 A | 3/1996 |
| JP | 2004-211042 A | 7/2004 |
| JP | 2004-291858 A | 10/2004 |
| JP | 2006-257150 A | 9/2006 |
| JP | 2009-102632 A | 5/2009 |
| JP | 2009-114432 A | 5/2009 |
| JP | 2012-025347 A | 2/2012 |
| TW | I228599 B | 3/2005 |
| WO | 2007/138916 A1 | 12/2007 |

OTHER PUBLICATIONS

Taiwanese Office Action issued with respect to Application No. 10420673500, dated May 27, 2015.
Extended European Search Report from Application No. 15767866.5 dated Sep. 25, 2017.

* cited by examiner

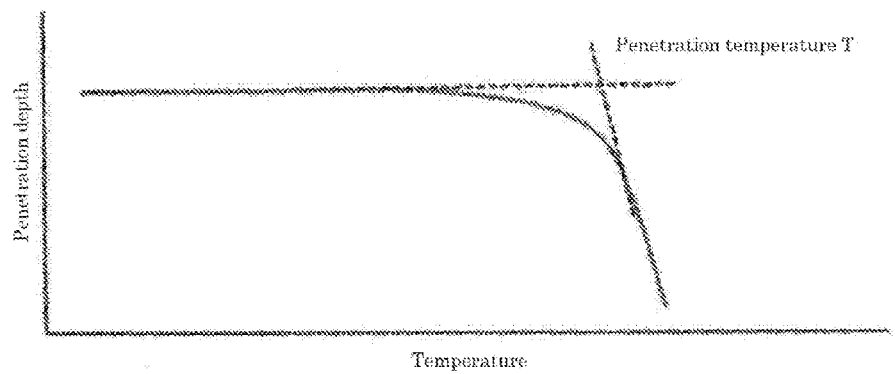

HIGH-DENSITY POLYETHYLENE MIXED RESIN PARTICLES, COMPOSITE RESIN PARTICLES, FOAMED PARTICLES AND FOAMED MOLDED BODY

TECHNICAL FIELD

The present invention relates to high-density polyethylene mixed resin particles, composite resin particles, foamed (expanded) particles, and a foamed (expanded) molded body (article). More specifically, the present invention relates to an expanded molded article having improved mechanical characteristics even at a high expansion ratio, expanded particles capable of applying the expanded molded article without requiring high-pressure expansion molding, composite resin particles for producing the expanded particles, and high-density polyethylene mixed resin particles used as seed particles when obtaining the composite resin particles by a seed polymerization method.

BACKGROUND TECHNOLOGY

It has been known that expanded molded articles comprising a polystyrene-based resin have excellent rigidity, thermal insulation properties, lightweight properties, water resistance, and expansion moldability. Therefore, this expanded molded articles have been widely used as cushioning materials and thermal insulation materials for building materials. However, the expanded molded articles comprising a polystyrene-based resin have the problem of inferior chemical resistance and impact resistance.

On the other hand, it has been known that expanded molded articles comprising a polyethylene-based resin have excellent chemical resistance and impact resistance. Therefore, this expanded molded articles are used in vehicle-related components. However, the polyethylene-based resins have inferior retention of a blowing agent, and thus it is necessary to precisely control expansion molding conditions. This leads to the problem of increase in production costs. In addition, this expanded molded articles have the problem of inferior rigidity compared to the expanded molded articles comprising the polystyrene-based resin.

In order to solve such aforementioned problems associated with the expanded molded articles comprising the polystyrene-based resin or polyethylene-based resin, various expanded molded articles obtained from composite resin particles of a polystyrene-based resin and a polyethylene-based resin e been reported. This expanded molded articles have both excellent rigidity and expansion moldability provided by the polystyrene-based resin and excellent chemical resistance and impact resistance provided by the polyethylene-based resin. However, such expanded molded articles have the problem of high dependency of mechanical characteristics on temperature. In order to suppress such temperature dependency, expanded molded articles using high-density polyethylene as a polyethylene-based resin have been reported (Japanese Unexamined Patent Application, First Publication No. 2012-025347),

PRIOR ART DOCUMENTS

Patent Documents

Patent Document 1: Japanese Unexamined Patent Application, First Publication No. 2012-025347

SUMMARY OF THE INVENTION

Problem to be Solved by the Invention

The composite resin particles described in the gazette can provide the expanded molded articles having improved dependency of mechanical characteristics on temperature. However, seed particles, composite resin particles, and expanded particles which can further improve impact resistance at a high expansion ratio without largely deteriorating the heat resistance and slow-burning properties of the expanded molded article, have been desired to be provided.

Mean for Solving the Problem

Thus, in accordance with the present invention, high-density polyethylene mixed resin particles used as seed particles during seed polymerization, wherein:
the seed particles contain a mixed resin of 100 parts by weight of high-density polyethylene and 20 to 100 parts by weight of an ethylene copolymer;
the high-density polyethylene has a density of 935 to 900 kg/m$^3$ and a softening temperature of 115 to 130° C.;
the ethylene copolymer is a copolymer of an ester-based monomer selected from an acrylic acid alkyl ester and an aliphatic saturated monocarboxylic acid vinyl, and ethylene, contains 1 to 20% by weight of an ester-based monomer-derived component, and has a softening temperature of 75 to 110° C.;
the acrylic acid alkyl ester is selected from methyl acrylate and ethyl acrylate; and the aliphatic saturated monocarboxylic acid vinyl is selected from vinyl acetate and vinyl propionate are provided.

Furthermore, in accordance with the present invention, composite resin particles containing a resin content comprising 100 parts by weight of a high-density polyethylene mixed resin derived from the high-density polyethylene mixed resin particles, and 100 to 500 parts by weight of a styrene-based polymer obtained by impregnating and polymerizing a styrene-based monomer in the seed particles are provided.

Also, in accordance with the present invention, expanded part icles obtained by impregnating a blowing agent into the composite resin particles, followed by expanding, and having a bulk density of 50 to 15 kg/m$^3$ are provided.

Furthermore, an expanded molded article obtained by expansion molding the expanded particles is provided.

EFFECTS OF INVENTION

In accordance with the present invention, high-density polyethylene mixed resin particles as seed particles for seed polymerization which can further improve impact resistance at a high expansion ratio without largely deteriorating the heat resistance and slow-burning properties of an expanded molded article can he provided. Also, an expanded molded article having further improved impact resistance at a high expansion ratio without largely deteriorating heat resistance and slow-burning properties can be provided.

When an ethylene copolymer has a MFR of 0.2 to 1.0 g/10 minutes, and contains 3 to 15% by weight of an ester-based monomer-derived component, high-density polyethylene mixed resin particles as seed particles for seed polymerization which can further improve impact resistance at a high expansion ratio without more largely deteriorating the heat resistance and slow-burning properties of the expanded molded article can be provided.

When the composite resin particles contain 1.5 to 6.0 parts by weight of a flame retardant with respect to 100 parts by weight of the resin content, composite resin particles which can further improve impact resistance at a high expansion ratio without more largely deteriorating the heat resistance and slow-burning properties of the expanded molded article can be provided.

When the flame retardant is a halogen-based flame retardant, composite resin particles which can further improve impact resistance at a high expansion ratio without more largely deteriorating the heat resistance and slow-burning properties of the expanded molded article can be provided.

When further containing a flame retardant auxiliary agent, and the flame retardant auxiliary agent is selected from dicumyl peroxide, 2,3-dimethyl-2,3-diphertyl butane, 3,4-dimethyl-3,4-diphenyl hexane, and cumene hydroperoxide, composite resin particles which can further improve impact. resistance at a high expansion ratio without more largely deteriorating the heat resistance and slow-burning properties of the expanded molded article can be provided.

BRIEF DESCRIPTION OF THE DRAWINGS

The FIGURE Drawing illustrates a method for specifying a penetration temperature from a TM curve.

BEST MODE FOR CARRYING OUT THE INVENTION

In recent years, because of further weight saving request and low cost intention of an expanded molded article, resin particles which can provide an expanded molded article of a high expansion ratio having heat resistance, slow-burning properties, and impact resistance while maintaining high productivity have been desired.

Therefore, the inventors of the present invention have revised raw materials for the expanded molded article. The expanded molded article is obtained by expansion molding composite resin particles produced by a so-called seed polymerization method in which styrene is impregnated and polymerized in the seed particles. The inventors have found that the constitution of the seed particles largely influences the various physical properties.

For example, the use of only an ethylene-vinyl acetate copolymer for the seed particles requires increase in the amount of a flame retardant in order to achieve predetermined slow-burning properties when an expanded molded article of a high expansion ratio is produced. However, the increase in the amount of the flame retardant causes deterioration in heat resistance.

Also, the use of high-density polyethylene makes it possible to provide predetermined heat resistance and slow-burning properties even at a high expansion ratio, but, it causes deterioration in impact resistance.

Furthermore, linear low-density polyethylene makes it difficult to provide predetermined heat resistance and slow-burning properties.

Furthermore, the use of polypropylene makes it possible to provide predetermined heat resistance, slow-burning properties, and impact resistance even at a high expansion ratio, but the use of polypropylene makes it necessary to use a high steam pressure during expansion molding, which causes deterioration in productivity.

In view of the above results, the inventors have further studied various raw materials, and as a result, they surprisingly found that high-density polyethylene mixed resin particles as seed particles for seed polymerization method containing a mixture which contains high-density polyethylene and a copolymer of ethylene and specific ester-based monomer can provide further improvement in impact resistance at a high expansion ratio without requiring expansion molding in a high steam pressure and without largely deteriorating the heat resistance and slow-burning properties of the expanded molded article, and thus leading to the present invention.

(High-Density Polyethylene Mixed Resin Particles: Seed Particles)

The seed particles of the present invention are high-density polyethylene mixed resin particles containing a mixed resin of high-density polyethylene and ethylene copolymer.

(1) High-Density Polyethylene

The high-density polyethylene is a resin comprising an ethylene homopolymer or a copolymer of ethylene and α-olefin having 3 to 8 carbon atoms. The α-olefin is more preferably a-olefin having 3 to 4 carbon atoms such as propylene or 1-butene from the viewpoint of heat resistance.

The high-density polyethylene used in the present invention is not particularly limited and a commercially available resin can be used as long as it is a resin having a density of 935 to 960 kg/m$^3$ and a softening temperature of 115 to 130° C. For example, the high-density polyethylene is available from Tosoh Corporation, Braskem, Japanese Polyethylene Corporation, and the like. The density can be 935 kg/m$^3$, 940 kg/m$^3$, 945 kg/m$^3$, 950 kg/m$^3$, 955 kg/m$^3$, and 960 kg/m$^3$. The softening temperature can be 115° C., 120° C., 125° C., and 130° C.

The density of less than 935 kg/m$^3$ may cause deteriorations in the heat resistance and slow-burning properties of the molded article. The density of more than 960 kg/m$^3$ may cause deterioration in expanding properties and insufficient impact resistance. The density is preferably 940 to 960 kg/m$^3$, and more preferably 946 to 955 kg/m$^3$. The softening temperature of lower than 115° C. may cause insufficient heat resistance. The softening temperature of higher than 130° C. may cause a number of polymerization powders and insufficient expanding properties when the composite resin particles are produced according to seed polymerization. The softening temperature is preferably 115 to 128° C., and more preferably 118 to 125° C.

(2) Ethylene Copolymer

The ethylene copolymer is a copolymer of an ester-based monomer selected from an acrylic acid alkyl ester and an aliphatic saturated monocarboxylic acid vinyl, and ethylene. The ester-based monomer is characterized by having a —COO— bond or a —OCO— bond in its molecule.

The acrylic acid alkyl ester is selected from methyl acrylate and ethyl acrylate.. The aliphatic saturated monocarboxylic acid vinyl is selected from vinyl acetate and vinyl propionate.

The ethylene copolymer is not particularly limited and a commercially available resin can be used as long as the proportion of an ester-based monomer-derived component contained in an ethylene-based polymer is 1 to 20% by weight, and the ethylene copolymer is a polymer having a softening temperature of 75 to 110° C. For example, the ethylene copolymer is available from Japanese Polyethylene Corporation, Tosoh Corporation, and the like. The proportion of the ester-based monomer-derived component contained in the ethylene-based polymer can be 1% by weight, 5% by weight, 10% by weight, 15% by we and 20% by weight. The softening temperature can be 75° C., 80° C., 85° C., 90° C., 95° C., 100° C., 105° C., and 110° C.

When the proportion of the ester-based monomer-derived component contained in the ethylene copolymer is less than 1% by weight, an improving effect of slow-burning properties may be insufficient. The proportion of more than 20% by weight may cause deterioration in heat resistance. The proportion is more preferably 3 to 15% by weight, and still more preferably 5 to 10% by weight.

The softening temperature of lower than 75° C. may cause deterioration in heat resistance. The softening temperature of higher than 110° C. may cause an insufficient improving effect of slow-burning properties. The softening tempera re is preferably 80 to 100° C., and more preferably 80 to 95° C.

The ethylene copolymer preferably has a MFR of 0.2 to 1.0 g/10 minutes. The MFR can be 0.2 g/10 minutes, 0.4 g/10 minutes, 0.6 g/10 minutes, 0.8 g/10 minutes, and 1.0 g/10 minutes. The MFR of less than 0,2 WM minutes may cause expanding variation during expanding. The MFR of more than 1.0 g/10 minutes may cause deterioration in heat resistance and shrinkage of a molded product. The MFR is more preferably 0.2 to 0.8 g/10 minutes, and still more preferably 0.3 to 0.6 g/10 minutes.

(3) Mixing Ratio of High-Density Polyethylene and Ethylene Copolymer

The mixed resin contains the ethylene copolymer in an amount of 20 to 100 parts by weight with respect to 100 parts by weight of the high-density polyethylene. The content of the ethylene copolymer can be 20 parts by weight, 40 parts by weight, 60 parts by weight. 80 parts by weight, and 100 parts by weight. The content of the ethylene copolymer of less than 20 parts by weight may cause an insufficient improving effect of slow-burning properties. The content of more than 100 parts by weight may cause deteriorations in heat resistance and impact. resistance. The content is preferably 30 to 90 parts by weight, and more preferably 40 to 75 parts by weight.

(4) Other Components

The seed particles may contain components other than the high-density polyethylene and the ethylene copolymer (other components). Examples of the other components include a colorant, a nucleating agent, a stabilizer, a filler (reinforcing material), a metal salt of higher fatty acid, a flame retardant, an antistatic agent, a lubricant, a natural or synthetic oil, a wax, an ultraviolet, absorber, a weathering stabilizer, an antifogging agent, an antiblocking agent, a slip agent, a covering agent, a neutron shielding agent, and the like. The content of the other components is preferably 10% by weight or less with respect to the total amount of the seed particles. The content can be 10% by weight or less, 8% by weight or less, 6% by weight or less 4% by weight. or less, 2% by weight or less, and 0% by weight.

(5) Method for Producing Seed Particles

The seed particles can be obtained by known methods. Examples of the methods include a method in which high-density polyethylene and an ethylene copolymer are melt kneaded in an extruder and then extruded from the extruder to obtain a strand; and the obtained strand is then cu in the air, cut under water, or cut while being heated to granulate the strand. The high-density polyethylene and the ethylene copolymer may be mixed in a mixer before these are fed into the extruder.

The seed particles preferably have a cylindrical shape, an elliptic spherical shape (egg shape), or a spherical shape. The seed particles more preferably have an elliptic spherical shape or a spherical shape in order to improve the filling properties of the expanded particles obtained from the seed particles to a molding cavity The seed particles preferably have an average particle diameter of 0.5 to 1.4 mm The average particle diameter can be 0.5 mm, 0.7 mm, 0.9 mm, 1.1 mm, and 1.4 mm.

(Composite Resin Particles)

(1) Constitution of Composite Resin Particles

The composite resin particles of the present invention contain a resin content comprising a high-density polyethylene mixed resin and a styrene-based polymer. The high-density polyethylene mixed resin is derived from the high-density polyethylene mixed resin particles. The styrene-based polymer is derived from a styrene-based monomer in the high-density polyethylene mixed resin particles are impregnated and polymerized (seed polymerized).

The styrene-based polymer is included in the resin content in a ratio of 100 to 500 parts by weight with respect to 100 parts by weight of the high-density polyethylene mixed resin particles. The content of the styrene-based polymer can be 100 parts by weight, 200 parts by weight, 300 parts by weight, 400 parts by weight, and 500 parts by weight. When the content of the styrene-based polymer is less than 100 parts by weight, the rigidity of the expanded molded article may deteriorate. When the content is more than 500 parts by weight, the chemical resistance and impact resistance of the expanded molded article may deteriorate. The content is preferably 150 to 400 parts by weight, and more preferably 200 to 350 parts by weight. The content of the styrene-based polymer roughly corresponds to the additive amount of the styrene-based monomer.

Examples of the styrene-based polymer include a polymer derived from a styrene-based monomer such as serene, α-methylstyrene, p-methylstyrene, and t-butylstyrene. Furthermore, the styrene-based polymer may be a component comprising a copolymer of a styrene-based monomer and other monomer capable of copolymerization the styrene-based monomer. Examples of the other monomer include polyfunctional monomers such as divinylbenzene, alkyl (meth)acrylate esters that contain no benzene ring within their structure, such as butyl (meth)acrylate, and the like. These other monomers may be used in the range that does not exceed 5% by weight in the styrene-based polymer.

The composite resin particles preferably contain a flame retardant. Examples of the flame retardant include a known halogen-based flame retardant, phosphorus-based flame retardant, inorganic flame retardant, and the like. Among these, the halogen-based flame retardant such as a bromine-based flame retardant, a chlorine-based flame retardant, or a chlorine-bromine-containing flame retardant is preferable from the viewpoint that high flame retardance can be applied to the expanded molded article with a small amount of the halogen-based flame retardant. Examples of the halogen-based flame retardant include tris(2,3-dibromopropyl)isocyanurate, tetrabromocyclooctane, hexabromocyclododecane, trisdibromopropylphosphate, tetrabromobisphenol A, tetrabromobisphenol A-bis(2,3-dibromo-2-methylpropyl ether), tetrabromobisphenol A-bis(2,3-dibromopropyl ether), and the like.

The flame retardant is preferably contained in an amount of 1.5 to 6.0 parts by weight with respect to 100 parts by weight of the resin content, The content of the flame retardant can be 1.5 parts by weght, 2.0 parts by weight, 2.5 parts by weight, 3.0 parts by weight, 3.5 parts by weight, 4.0 parts by weight, 4.5 parts by weight, 5.0 parts by weight, 5.5 parts by weight, and 6.0 parts by weight. When the content of the flame retardant is less than 1.5 parts by weight, an improving effect of flame retardance may be insufficient. When the content is more than 6.0 parts by weight., the chemical resistance, impact. resistance, and heat resistance of the expanded molded article may deteriorate. The content is preferably 1.5 to 4.0 parts by weight, and more preferably 2.0 to 3.5 parts by weight.

In addition to the flame retardant, the composite resin particles preferably contain a flame retardant auxiliary agent. By containing the flame retardant auxiliary agent, the flame retardance exhibited by the flame retardant may he further improved. Examples of the flame retardant auxiliary agent include organic peroxides such as dicumyl peroxide, 2,3-dimethyl-2,3-diphenyl butane (alias name: biscumyl), 3,4-dimethyl-3,4-diphenyl hexane, and cumene hydroperoxide.

The flame retardant auxiliary agent is preferably contained in an amount of 50 parts by weight or less with respect to 100 parts by weight of the flame retardant. The upper limit of the content, of the flame retardant auxiliary agent can be 50 parts by weight, 40 parts by weight, 30 parts by weight, 20 parts by weight, and 10 parts by weight. The flame retardant auxiliary agent may not be contained. When the content of the flame retardant auxiliary agent is more than 50 parts by weight, the chemical resistance, impact resistance, and weather resistance of the expanded molded article may deteriorate. The content is more preferably 10 to 40 parts by weight, and still more preferably 15 to 25 parts by weight.

The composite resin particles preferably have a cylindrical shape, a roughly spherical shape, or a spherical shape, and an average particle diameter of 0.6 to 1.8 mm. The average particle diameter can be 0,6 ram, 0.8 mm, 1.0 mm, 1.2 mm, 1.4 mm, 1.6 mm, and 1.8 mm. The composite resin particles more preferably have a roughly spherical shape or a spherical shape in coder to improve the -filling properties of the expanded particles derived from the composite resin particles to a molding cavity.

(2) Method for Producing Composite Resin Particles

The composite resin particles can be formed by a so-called seed polymerization method using high-density polyethylene mixed resin particles as seed particles. The seed polymerization method can be carried out according to the following procedure.

Specifically, seed particles, a styrene-based monomer and, as necessary, a polymerization initiator are dispersed in an aqueous suspension. The styrene-based monomer and the polymerization initiator may he used in a state where these are previously mixed.

Examples of an aqueous medium contained in the aqueous suspension include water, and a mixed medium of water and water-soluble solvent (for example, lower alcohol).

The polymerization initiator used may he a polymerization initiator generally used as an initiator for the suspension polymerization of the styrene-based monomer. Examples of the polymerization initiators include organic peroxides such as benzoyl peroxide, di-t-butyl peroxide, t-butylperoxybenzoate, dicumyl peroxide, 2,5-dimethyl-2,5-di-t-butyl peroxyhexane, t-butyl peroxy-3,5,5-trimethyl hexanoate, and t-butyl peroxy-2-ethylhexyl carbonate. These polymerization initiators may be used alone or in combinations of two or more types.

The used amount of the polymerization initiator is preferably 0.1 to 0.9 parts by weight with respect to 100 parts by weight of the styrene-based monomer. The used amount of the polymerization initiator can be 0.1 parts by weight, 0.3 parts by weight, 0.5 parts by weight, 0.7 parts by weight, and 0.9 parts by weight. The used amount of less than 0.1 parts by weight may cause too much time for the polymerization of the styrene-based monomer. The use of the polymerization initiator of more than 0.9 parts by weight may cause decrease in the molecular weight of a polystyrene-based resin. The used amount is more preferably 0,2 to 0.5 parts by weight.

Into the aqueous suspension, a dispersant may be added as necessary. Any known dispersant can be used without particular limitation. Specific examples thereof include hardly-soluble inorganic substances such as calcium phosphate, magnesium pyrophosphate, sodium pyrophosphate, magnesium oxide, and the like, Furthermore, a surfactant such as sodium dodecvlbenzenesulfonate may be used.

Next, the obtained dispersion liquid is heated to a temperature that the styrene-based monomer does not substantially polymerized, to impregnate the styrene-based monomer into the seed particles. The time appropriate for impregnating the styrene-based monomer into the seed particles is 30 minutes to 2 hours. The impregnating time can be 30 minutes, 1 hour, 1.5 hours, and 2 hours. This is because polymer powder of the polystyrene-based resin due to polymerization taking place before the styrene-based monomer is sufficiently impregnated into the seed particles is generated. It is advantageous that the temperature that the styrene-based monomer does not substantially polymerized is as high as possible to accelerate the impregnation speed, but it is preferably determined in consideration of the decomposition temperature of the polymerization initiator.

Subsequently, polymerization of the styrene-based monomer is carried out. The polymerization is preferably carried out at 105 to 140° C. for 1.5 to 5 hours without particular limitation. The polymerization temperature can be 105° C., 115° C., 125° C., 135° C., and 140° C. The polymerization tune can be 1.5 hours, 2,5 hours, 3.5 hours, 4.5 hours, and 5 hours. Usually, the polymerization is carried out in a pressurizable closed vessel.

The impregnation and polymerization of the styrene-based monomer may he divisionally carried out a plurality of times. By divisionally carrying out the impregnation and the polymerization a plurality of times, the generation of the polymer powder of the polystyrene-based resin can be reduced as much as possible. The phrase "a plurality of times" means two times, three times, four times, and five times or more.

The composite resin particles can be obtained according to the aforementioned step. Since the obtained composite resin particles have an inner part rich in a polystyrene-based resin and an outer shell part rich in a polyethylene-based resin, the inventors consider that the composite resin particles have good influence on the physical properties of the expanded molded article.

The composite resin particles containing the flame retardant and the flame retardant auxiliary agent can be obtained by a method including impregnating the flame retardant and the flame retardant auxiliary agent together with the styrene-based monomer into the seed particles, a method including impregnating into the resin particles after the polymerization, and the like.

(Expanded Particles)

The expanded particles are particles obtained by impregnating a blowing agent into composite resin particles to obtain expandable particles, and thereafter expanding the expandable particles. Examples of the blowing agent include propane, n-butane, isobutane, n-pentane, isopentane, cyclopentane, hexane, dimethyl ether, and the like. These blowing agents may be used alone or in combinations of two or more types. The content of the blowing agent is preferably 5 to 25 parts by weight with respect to 100 parts by weight of the composite resin particles. The content of the blowing agent can be 5 parts by weight, 10 parts by weight, 15 parts by weight, 20 parts by weight, and 25 parts by weight.

The expanded particles have a bulk density of 50 to 15 kg/m³. The bulk density can be 50 kg/m³, 40 kg/ms, 30 kg/ms, 20 kg/ms, and 15 kg/m³. When the bulk density is less than 15 kg/m³, a closed cell rate decreases when the expanded particles are expanded, which may cause decrease in the strength of the expanded molded article obtained from pre-expanded particles. On the other hand, when the bulk density is more than 50 kg/m³, an effect of the weight saving of the obtained expanded molded article may be small. The bulk density is more preferably 40 to 22 kg/m³, The expandable particles can be obtained by impregnating the blowing agent into the composite resin particles during or after the polymerization. This impregnation can be carried out by per se known methods. For example, the impregnation during the polymerization can be carried out by making polymerization reaction to occur in a closed vessel and feeding under pressure the blowing agent into the vessel. The impregnation after the polymerization can be carried out by feeding under pressure the blowing agent in the closed vessel.

Furthermore, the expandable particles can be expanded by known ethods such as a method including heating expandable particles in a vessel with steam.

(Expanded Molded Article)

The expanded molded article can be obtained by filling a molding cavity of a expansion molding machine with expanded particles and subjecting the expanded particles to thermal fusion bonding while heating the expanded particles with water vapor to expand the expanded particles. The expanded particles containing the aforementioned seed particles have an advantage of nonrequiring a high pressure as a expansion molding condition for obtaining the expanded molded article. Specifically, the expanded molded article can be obtained with steam having a pressure of 0.05 to 0.15 MPa as a general gage pressure. Therefore, a expansion molding machine for usual expanding can be used, which can provide a cost reduction for obtaining the expanded molded article. The pressure of the steam can be 0.05 MPa, 0.08 MPa, 0.10 MPa, 0.12 MPa, and 0.15 MPa.

The expanded molded article has particularly excellent, shrinkage ratio, flame retardance, and impact resistance, Specifically, there can be provided an expanded molded article having a rate of dimensional change of 1.5% or less during dimensional change measurement at 80° C. in accordance with 315 K6767. In a burning speed test method in accordance with FMVSS 302, an expanded molded article having a burning speed of 80 mm/muiute or less can be provided. Furthermore, an expanded molded article having a falling ball impact value of 25 cm or more can be provided.

The expanded molded article preferably has a density of 50 to 20 kg/m³. The density can be 50 kg/m³, 40 kg/m³, 30 kg/m³, and 20 kg/m³. When the density is less than 20 kg/m³, a closed cell rate increases, which may cause decrease in a strength. On the other hand, when the density is more than 50 kg/m³, an effect of weight saving may be small. The density is more preferably 40 to 25 kg/m³.

The expanded molded article of the present invention can be used in various applications including vehicle cushioning materials such as a core material for bumpers and a cushioning material within door panels, cushioning materials and transport containers for various industrial materials including electronic components and glass, and foodstuffs. The expanded molded article can be particularly preferably used as a vehicle cushioning material.

EXAMPLES

The present invention is specifically described below based on examples, but the present invention is in no way limited by these examples.

Methods for measuring various physical properties in the following examples is described below.

<Density of High-Density Polyethylene>

The density was measured by the density gradient tube method in accordance with JIS K6922-1: 1998.

<MFR of High-Density Polyethylene and Ethylene Copolymer>

The melt mass flow rate (MFR) was measured by b) a method for measuring a time for which a piston moves by a predetermined distance in the B method described in JIS K7210: 1999 "Plastics-Determination of The Melt Mass-Flow Rate (MFR) and The Melt Volume-Flow Rate (MVR) of Thermoplastics" using Semi Auto Melt Indexer 2A manufactured by TOYO SEIKI Co., Ltd. Measurement conditions are as follows: sample weight: 3 to 8 g; preheating time: 270 seconds; load hold time: 30 seconds; test temperature: 190° C.; test force: 21.18 N; and piston moving distance (interval): 25 mm. The number of times of test of the sample was set to three times, and the average thereof was defined as a melt mass flow rate (g/10 minutes) value.

<Melting Point of High-Density Polyethylene and Ethylene-Based Copoiyiner>

The melting point was measured by the method described in JIS K7121; 1987 "Testing Methods for Transition Temperature of Plastics", except that sampling method and temperature condition were performed as follows.

Using a DSC6220 type differential scanning calorimeter device (manufactured by SIT Nano Technology Inc.), an aluminum measurement vessel was filled with about 6 mg of a sample so as not to form any clearance in the bottom of the vessel. After the filling, at a nitrogen gas flow rate of 20 mL/minute, the temperature was cooled from 30° C. to −40° C. and then held for 10 minutes. After the holding, the temperature was raised from 40° C. to 220° C. (first heating), and then held for 10 minutes. Subsequently, the temperature was cooled from 220° C. to -40° C. (cooling), and then held for 10 minutes. Then, the temperature was raised from −40° C. to 220° C. (second heating) to obtain a DSC curve. All the temperature increases and temperature decreases were carried out at a rate of 10° C./minute, and alumina was used as a standard substance. Herein, the melting point is a value obtained by reading the temperature of the top of a melting peak observed in the second heating process using an analysis software attached to the device.

<Softening Temperature of High-Density Polyethylene and Ethylene-Based Copolymer>

The softening temperature was measured in accordance with the method described in JIS K7196: 1991 "Testing Methods for Softening Temperature of Thermoplastic Film and Seeting by Thermomechanical Analysis".

Specifically, a resin sample was thermally pressed at 180° C. for 5 minutes to produce a disk plate-like test piece having a thickness of 1 mm and a diameter of 10 mm. A probe was put on the test piece in a penetrating test mode (tip end of the probe: ϕ1 mm, quartz probe) under a load of 500 mN under a nitrogen atmosphere with the use of an apparatus of measuring heat, stress and distortion (trade name "EXSTRAR TMA/SS6100" manufactured by Sil Nano Technology Inc.), wherein the temperature was raised at a rate of temperature increase of 5° C./minute from 30° C., to obtain a TMA curve. The obtained TMA curve was corrected according to quartz coefficient setting by an analysis software attached to the device. A linear portion recognized at the low-temperature side before the indenter (probe) starts to enter was extended to the high-temperature side in the TMA curve, and the intersection of an extension to the low-temperature side of a tangent line of the portion where the entering speed becomes the maximum is defined as a penetration temperature, wherein the penetration temperature is defined as the softening temperature of this resin sample. A method for specifying the penetration temperature from the TMA curve is shown in FIG. 1.

<Bulk Density of Expanded Particles>

The bulk density of expanded particles was measured as follows. First, the expanded particles were filled in a measuring cylinder up to a scale of 500 cm$^3$. The measuring cylinder was visually confirmed from the horizontal direction, and when even one particle of the expanded particles reached the scale of 500 cm$^3$, the filling of the expanded particles into the measuring cylinder was ended at this point. Next, the weight of the expanded particles filled in the measuring cylinder was weighed down to the effective number at the second decimal place, and this weight was defined as W (g). The bulk density of the expanded particles was calculated according to the following equation. Bulk density of expanded particles (kg/m$^3$)=W/500×1000

<Density of Expanded Molded Article>

A test piece (for example, 75×300×35 mm) cut out of an expanded. molded article (dried at 50° C. for 4 hours or more after molding) was measured for the weight (a) and the volume (b) to three or more significant figures, respectively. The density (kg/m$^3$) of the expanded molded article was determined according to the equation (a)/(b).

<Rate of Dimensional Change on Heating of Expanded Molded Article>

The rate of dimensional change on heating of the expanded molded article was measured according to the B method described in JIS K6767: 1999 "Cellular Plastics-Polyethylene-Methods of Test". Specifically a test piece having a size of 150 mm length×150 mm width×20 mm height was cut from an expanded molded article. On the surface of the test piece, three straight lines pointed in the longitudinal direction and. having a length of 50 mm were drawn at intervals of 50 mm in parallel with each other, and three straight lines pointed in the transverse direction and having a length of 50 min were drawn at intervals of 50 mm in parallel with each other. Thereafter, the test piece was left to stand in a circulating hot air drier at 80° C. over a period of 168 hours, and then taken out. The test piece was left to stand over a period of 1 hour under a standard condition (20±2° C., humidity 65±5%). Next, the lengths of the six straight lines drawn on the surface of the test piece were measured, to calculate an arithmetic average value L1 of the lengths of the six straight lines. A degree of change S was calculated based on the following equation, and the absolute value of the degree of change S was defined as a rate of dimensional change on heating (%).

$$S=100\times(L1-50)/50$$

The rate of dimensional change on heating was determined as follows.

○ (good): 0≤S≤1.5; low rate of dimensional change and good dimensional stability × (unacceptable): S≥1.5; remarkably large dimensional change <Burning Speed of Expanded Molded Article>

The burning speed was measured by the method in accordance with United States Federal Motor Vehicle Safety Standard FMVSS 302.

A test piece was prepared, which has a size of 350 mm×100 mm×12 mm (thickness), wherein at least the two 350 mm×100 mm surfaces have a skin, The burning speed was evaluated according to the following standard.

○ (good): In the expanded molded article having a predetermined density, the burning speed was less than 80 min/minute, or in the expanded molded article having a predetermined density, the flame was extinguished before reaching the measurement start point. In this case, the burning speed was defined as 0 mm/minute (self-extinguishing properties).

× (unacceptable): In the expanded molded article having a predetermined density, the burning speed was more than 80 min/minute.

<Falling Ball Impact Value of Expanded Molded Article>

The falling ball impact strength was measured in accordance with the method described in JIS K7211: 1976 "General Rules for Testing Impact Strength of Rigid Plastics by The Falling Weight Method".

After an expanded molded article having a predetermined density was dried at a temperature of 50° C. for 1 day, and a test piece (six surfaces having no skin) of 40 mm×215 min×20 mm (thickness) was cut out of the expanded molded article.

Subsequently both ends of the test piece were fixed using clamps so that the spa between fulcrums was 150 mm, a steel ball having a weight of 321 g was made to fall from a predetermined height onto the central portion of the test piece, and the presence/absence of breaking of the test piece was observed.

The test was conducted with the rigid ball falling height (test height) being changed at intervals of 5 cm from the minimum height for ah the five test pieces to be broken to the maximum height for none of the test pieces to be broken, and the falling ball impact value (cm), in other words, the 50% breaking height, was calculated from the following calculation formula.

$$H50=Hi+d[\Sigma(i\cdot ni)/N\pm 0.5]$$

The symbols in the equation mean the following.

H50. 50% breaking height (cm)

Hi: Test height (cm) when the height level is 0 and the height from which the test piece is expected to be broken d: Height interval (cm) when the test height is elevated or lowered i: Height level which increases or decreases one by one (i= . . . −3, −2, −1, 0, 1, 2, 3 . . . ) with the height level at Hi being 0 ni: Number of test pieces broken (or not broken) at each level, for which data of the greater number is used (if the numbers are the same, either may be used)

N: Total number (N=Σni) of test pieces broken (or not broken) at each level, for which data of the greater number is used (if the numbers are the same, either may be used)

±0.5: A negative number is employed when data of broken test pieces is used, and a positive number is employed when data of not-broken test pieces is used ○ (good): Falling ball impact value of 30 cm or more Δ (acceptable): Falling ball impact value of 25 cm or more and less than 30 cm × (unacceptable): Falling ball impact value of less than 25 cm <Chemical Resistance of Expanded Molded Article>

A plate-like test piece having a flat rectangular shape and a size of 100 mm length×100 mm width×20 mm thickness was cut from the expanded molded article. The test piece was left to stand under the conditions of 23° C. and a humidity of 50% for 24 hours, In addition, the test piece was cut from the expanded molded article so that the entire upper surface of the test piece was formed of the skin of the expanded molded article. Next, 1 g of gasoline was uniformly applied to the upper surface of the test piece and the test piece was left to stand under the conditions of 23° C. and a humidity of 50% for 60 minutes. Then, the chemicals were wiped off the upper surface of the test piece, and the upper surface of the test piece was visually observed and determined based on the following standard.

The chemical resistance was determined as follows.
○ (good): no change
Δ (acceptable) surface softening
× (unacceptable): surface cave in (shrink <Molding Properties>

A molding cavity having a size of 300 mm×400 mm×30 ann in an expansion molding machine is filled with expanded particles, and the expanded particles are subjected to thermal fusion bonding while being heated with steam to expand the expanded particles, to obtain an expanded molded article having a rectangular parallelopiped shape with an upper surface of 400 mm length×300 mm width and 30 mm thickness.

In the case of heating by steam, the steam pressure is chan,ed from 0.08 MPa to 0.25 MPa by 0.01 MPa, and the steam is introduced for 20 seconds, to carry out a molding test.

As a result of the above molding, the obtained expanded molded article is evaluated according to the following standard based on the lowest steam pressure in which the fusion rate of the expanded molded article is 90% or more. The lowest steam pressure in which the fusion rate of 90% is obtained is referred to as an adjusting pressure during molding.

○ (good): An expanded molded article having a fusion rate of 90% or more at a steam pressure of 0.15 MPa or less is obtained. The expanded molded article can be molded in a low pressure, which has high productivity.

× (unacceptable): A steam pressure of more than 0.15 MPa is required to obtain an expanded molded article having a fusion rate of 90% or more, which causes difficulties in productivity.

The fusion rate is measured in the following procedure.

In the upper surface of the expanded molded article, a cutter is used to form a 300 mm length and 5 mm depth cut line along the width direction, and the expanded molded article is then split in half along this cut line. Within the ruptured surface of the expanded molded article split in half, the number of expanded particles (a) that had ruptured through the interior of the expanded particle, and the number of expanded particles (b) that had ruptured at the interface between expanded particles are measured, and the fusion rate is calculated based on the following equation.

Fusion rate(%)=100×(a)/[(a)+(b)]

Example 1

100 parts by weight of high-density polyethylene having a density of 936 kg/m$^3$, MFR, of 2.6 g/10 minute, a melting point of 123° C., and a softening temperature of 118° C. (product number 09S53B manufactured by Tosoh Corporation) and 67 parts by weight of an ethylene-vinyl acetate copolymer (ethylene copolymer, copoiviner of aliphatic saturated monocarboxylic acid vinyl and ethylene: product number LV115 manufactured by Japanese Polyethylene Corporation, MFR: 0.3 g/10 minute, melting point: 108° C., softening temperature: 80° C., and vinyl acetate-derived component content: 4% by weight) were fed into a tumbler mixer where these were mixed for 10 minutes.

Subsequently, this resin mixture was supplied to an extruder, melt-kneaded at a temperature of 230 to 250° C., pelletized according to underwater cutting method, and cut in an elliptic spherical shape (egg shape), to obtain high-density polyethylene mixed resin particles (seed particles). The average weight of the high-density polyethylene mixed resin particles was 0.6 mg.

Next, in a 5 L autoclave equipped with a stirrer, 40 g of magnesium pyrophosphate and 0.6 g of sodium dodecylbenzenesulfonate were dispersed in 2 kg of pure water to obtain a dispersion medium, 600 g of seed particles were dispersed in the dispersion medium at 30° C. The dispersion medium was held for 10 minutes, and subsequently heated to 60° C. to obtain a suspension. Furthermore, 300 g of styrene having 0.6 g of dicumyl peroxide as a polymerization initiator dissolved therein was added dropwise to the suspension over a period of 30 minutes After the dropwise addition, the suspension was held for 30 minutes to impregnate styrene, into the seed particles. After the impregnation, the temperature of the suspension was raised to 140° C., and held thereat, for 2 hours to carry out the polymerization (first polymerization).

Next, to the suspension cooled to 115° C., 20 g of pure water having 3 g of sodium dodecylbenzenesulfonate dispersed therein was added dropwise over a period of 10 minutes, and 1100 g of styrene having 4 g of dicumyl peroxide dissolved therein was then added dropwise to the suspension over a period of 4.5 hours. After the dropwise addition, the suspension was held at 120° C. for 1 hour, to impregnate styrene into the seed particles. After the impregnation, the temperature of the suspension was raised to 140° C., and held thereat for 3 hours to carry out the polymerization (second polymerzation). As a result of the polymerization, composite resin particles could he obtained (the weight ratio of the seed particles and polystyren 30/70).

Then, the temperature of the reaction system was set to 60° C., and 50 g of tris(2,3-dihromopropyl)isocyanurate (manufactured by Nippon Kasei Chemical Co., Ltd.) as a flame retardant and 10 g of dicumyl peroxide as a flame retardant auxiliary agent were fed into this suspension. After the feeding, the temperature of the reaction system was raised to 130° C., and stirring was continued for 2 hours to obtain flame retardant-containing composite resin particles.

Subsequently, the reaction system was cooled to 30° C. or less, and the composite resin particles were taken out from the autoclave. 2 kg of the composite resin particles, 2 L of water, and 2.0 g of sodium dodecylbenzenesulfonate were placed in a 5 L autoclave equipped with a stirrer. Furthermore, 15 parts by weight (300 g, 520 mL) of butane (n-butane:i-butane=7:3) as a blowing agent was placed in the autoclave. Then, the temperature was raised to 70° C., and stirring was continued for 4 hours, to allow expandable particles to be obtained. Then, the reaction system was cooled to 30° C. or below, and the expandable particles were taken out from the autoclave and dehydration-dried.

Subsequently, the obtained expandable particles were pre-expanded to a bulk density of 25 kg/m$^3$ to obtain expanded particles. After the obtained expanded particles were left to stand at room temperature (23° C.) for 1 day, the expanded particles were placed in a molding cavity having a size of 400 mm×300 mm×30 mm.

Then, this was heated by introducing 0.09 MPa of steam for 20 seconds into the molding cavity. Subsequently, the expanded molded article was cooled until the maximum e pressure of the expanded molded article was reduced to 0.01 MPa to obtain an expanded molded article having a fusion rate of 90% or more and a density of 25 kg/m³.

The obtained expanded molded article had a good appearance.

Example 2

Other than changing the bulk density of expanded particles and the density of the expanded molded article to 21 kg/m³, an expanded molded article having a fusion rate of 90% or more was obtained in the same manner as in Example 1. The obtained expanded molded article had a good appearance.

Example 3

Other than changing the bulk density of expanded particles and the density of the expanded molded article to 33 kg/m³, an expanded molded article having a fusion rate of 90% or more was obtained in the same manner as in Example 1. The obtained expanded molded article had a good appearance.

Example 4

Other than dispersing 800 g of seed particles in a dispersion medium at 30° C.; using 400 g of a styrene monomer having 0.8 g of dicumyl peroxide dissolved therein in first polymerization; using 800 g of a styrene monomer having 4 g of dicumyl peroxide dissolved therein in second polymerization; changing the bulk density of expanded particles and the density of the expanded molded article to 33 kg/m³; and heating using steam of 0.1.0 MPa, an expanded molded article having a fusion rate of 90% or more was obtained in the same manner as in Example 1. The obtained expanded molded article had a good appearance.

Example 5

Other than changing the high-density polyethylene to a high-density polyethylene having a density of 953 kg/m³, a MFR of 2.2 g/10 minutes, a melting point of 131° C., and a softening temperature of 128° C. (product number SEG-7252 manufactured by Braskem) and heating using steam of 0.13 MPa, an expanded molded. article having a fusion rate of 90% or more was obtained in the same manner as in Example 1. The obtained expanded molded article had a good appearance.

Example 6

Other than changing the high-density polyethylene to a high-density polyethylene having a density of 951 kg/m³, a MFR of 2.5 g/10 minutes, a melting point of 132° C., and a softening temperature of 122° C. (product number HY350 manufactured by Japanese Polyethylene Corporation); and heating using steam of 0.13 MPa, an expanded molded article having a fusion rate of 90% or more was obtained in the same manner as in Example 1. The obtained expanded molded article had a good appearance.

Example 7

Other than changing the ethylene copolymer to a copolymer of an acrylic acid alkyl ester and ethylene (product number A1100 manufactured by Japanese Polyethylene Corporation, MFR: 0.4 g/10 minutes, melting point: 104° C., softening temperature: 83° C., ethyl acrylate-derived component content: 10% by weight); changing the flame retardant auxiliary agent to biscumyl; and heating using steam of 0.08 MPa, an expanded molded article having a fusion rate of 90% or more was obtained in the same manner as in Example 1. The obtained expanded molded article had a good appearance.

Example 8

Other than changing the ethylene copolymer to a copolymer of an acrylic acid alkyl ester and ethylene (product number A1100 manufactured by Japanese Polyethylene Corporation); changing the weight ratio of high -density polyethylene and acrylic-containing copolymer to 60:40; changing the flame retardant auxiliary agent to biscumyl; and heating using steam of 0.09 MPa, an expanded molded article having a fusion rate of 90% or more was obtained in the same manner as in Example 1. The obtained expanded molded article had a good appearance.

Example 9

Other than changing the ethylene copolymer to product number LV430 manufactured by Japanese Polyethylene Corporation (MFR 1.0 g/10 minutes, melting point: 89° C., softening temperature: 73° C., vinyl acetate-derived component content: 15% by weight); changing the flame retardant auxiliary agent to biscumyl; and heating using steam of 0.08 MPa, an expanded molded article having a fusion rate of 90% or more was obtained in the same manner as in Example 1. The obtained expanded molded article had a good appearance.

Example 10

Other than changing the ethylene copolymer to product number LV211 manufactured by Japanese Polyethylene Corporation (MFR: 0.3 g/10 minutes, melting point: 103° C., softening temperature: 84° C., vinyl acetate-derived component content: 6% by weight), an expanded molded article having a fusion rate of 90% or more was obtained in the same manner as in Example 1. The obtained expanded molded article had a good appearance.

Example 11

Other than changing the ethylene copolymer to a copolymer of an acrylic acid alkyl ester and ethylene (product number A3100 manufactured by Japanese Polyethylene Corporation, MFR: 3 g/10 minutes, melting point: 104° C., softening temperature: 75° C., ethyl acrylate-derived component content: 10%by weight); changing the weight ratio of high-density polyethylene and acrylic-containing copolymer to 20:80; changing the flame retardant auxiliary agent to biscumyl; and heating using steam of 0.10 MPa, an expanded molded article having a fusion rate of 90% or more was obtained in the same manner as in Example 1. The obtained expanded molded article had a good appearance.

Example 12

Other than changing the ethylene copolymer to a copolymer of an acrylic acid alkyl ester and ethylene (product number A1100 manufactured by Japanese Polyethylene Corporation, MFR: 0.4 g/10 minutes, melting point: 104° C., softening temperature: 83° C., ethyl acrylate-derived component content: 10% by weight); changing the high-density polyethylene to a high-density polyethylene having a density of 951 kg/m$^3$, a MFR of 2.5 g/10 minutes, a melting point of 132° C., and a softening temperature of 122° C. (product number HY350 manufactured by Japanese Polyethylene Corporation); and changing the flame retardant auxiliary agent to biscumyl, an expanded molded article having a fusion rate of 90% or more was obtained in the same manner as in Example 1. The obtained expanded molded article had a good appearance.

Comparative Example 1

Other than using particles containing only a polypropylene resin (product number F744NP manufactured by Prime Polymer Co., Ltd.) as seed particles; dispersing 800 g of seed particles in a dispersion medium at 30° C.; using 400 g of a styrene monomer having 0.8 g of dicumyl peroxide dissolved therein in first polymerization; using 800 g of a styrene monomer having 4g of dicumyl peroxide dissolved therein in second polymerization; and heating using steam of 0.25 MPa, an expanded molded article having a fusion rate of 90% or more was obtained in the same manner as in Example 1. The obtained expanded molded article had a good appearance.

Comparative Example 2

Other than using particles containing only a low-density polyethylene resin (product number NF444A manufactured by Japanese Polyethylene Corporation, density: 912 kg m$^3$, MFR: 2 g/10 minutes, melting point: 121° C., softening temperature: 93° C.) as seed particles; and heating using steam of 0.08 MPa, an expanded molded article having a fusion rate of 90% or more was obtained in the same manner as in Example 1. The obtained expanded molded article had a good appearance.

Comparative Example 3

Oilier than using particles containing only high-density polyethylene as seed particles; and heating using steam of 0.10 MPa, an expanded molded article having a fusion rate of 90% or more was obtained in the same manner as in Example 1. The obtained expanded molded article had a good appearance.

Comparative Example 4

Other than changing the ethylene copolymer to a copolymer of an alkyl methacrylate ester and ethylene (product number WD201 manufactured by Sumitomo Chemical Co., Ltd., MFR: 2 g/10 minutes, melting point: 100° C., softening temperature: 75° C., and methyl methacrylate-derived component content: 10% by weight); and heating using steam of 0.10 MPa, an expanded molded article having a fusion rate of 90% or more was obtained in the same manner as in Example 1. The obtained expanded molded article had a good appearance.

Comparative Example 5

Other than changing the weight ratio of high-density polyethylene and ethylene copolymer to 10:90; and heating using steam of 0.10 MPa, an expanded molded article having a fusion rate of 90% or more was obtained in the same manner as in Example 1. The obtained expanded molded article had a good appearance.

Comparative Example 6

Other than changing the weight ratio of high-density polyethylene and ethylene copolymer to 20:80; and heating using steam of 0.08 MPa, an expanded molded article having a fusion rate of 90% or more was obtained in the same manner as in Example 1. The obtained expanded molded article had a good appearance.

Comparative Example 7

Other than using particles containing only a high-density polyethylene resin (product number HY350 manufactured by Japanese Polyethylene Corporation) as seed particles; changing the bulk density of expanded particles and the density of the expanded molded article to 33 kg/m$^3$; and heating using steam of 0.08 MPa, an expanded molded article having a fusion rate of 90% or more was obtained in the same manner as in Example 1. The obtained expanded molded article had a good appearance.

Comparative Example 8

Other than changing the high-density polyethylene resin to a low-density polyethylene resin (product number NF144A manufactured by Japanese Polyethylene Corporation); and heating using steam of 0.08 MPa, an expanded molded article having a fusion rate of 90% or more was obtained in the same manner as in Example 1. The obtained expanded molded article had a good appearance.

The results obtained from the above Examples and Comparative examples are shown in Tables 1 to 3.

In Tables, "Resin A" means an ethylene copolymer, "Resin B" means high-density polyethylene, "TAIC6B" means tris(2,3-dibromopropyl)isocyanurate, "BC" means biscumyl, "DCP" means dicumyl peroxide, and "AE" means self-extinguishing properties.

TABLE 1

| | | Example 1 | Example 2 | Example 3 | Example 4 | Example 5 | Example 6 |
|---|---|---|---|---|---|---|---|
| Seed Particles | Resin A | LV115 | LV115 | LV115 | LV115 | LV115 | LV115 |
| | Resin B | 09S53B | 09S53B | 09S53B | 09S53B | SGE7252 | HY350 |
| | Resin A/Resin B (weight ratio) | 40/60 | 40/60 | 40/60 | 40/60 | 40/60 | 40/60 |
| Composite Resin Particles | Seed Particles/PS (weight ratio) | 30/70 | 30/70 | 30/70 | 40/60 | 30/70 | 30/70 |
| | Flame Retardant (additive amount; parts by weight) | TAIC6B(2.5) | TAIC6B(2.5) | TAIC6B(2.5) | TAIC6B(2.5) | TAIC6B(2.5) | TAIC6B(2.5) |

TABLE 1-continued

|  |  | Example 1 | Example 2 | Example 3 | Example 4 | Example 5 | Example 6 |
|---|---|---|---|---|---|---|---|
|  | Flame Retardant Auxiliary Agent (additive amount; parts by weight) | DCP(0.5) | DCP(0.5) | DCP(0.5) | DCP(0.5) | DCP(0.5) | DCP(0.5) |
| Expanded Molded Article | Adjusting Pressure during Molding MPa | 0.09 | 0.09 | 0.09 | 0.10 | 0.13 | 0.13 |
|  | Density of Expanded Molded Article kg/m$^3$ | 25 | 21 | 33 | 33 | 25 | 25 |
|  | Dimensional Change Rate % (Evaluation) | 1.0 (○) | 1.1 (○) | 0.8 (○) | 1.0 (○) | 0.8 (○) | 0.8 (○) |
|  | Burning Speed mm/min. (Evaluation) | AE (○) | AE (○) | AE (○) | AE (○) | AE (○) | AE (○) |
|  | Falling Ball Impact Value cm (Evaluation) | 30.5 (○) | 26.5 (Δ) | 40.5 (○) | 43.5 (○) | 30.5 (○) | 31.5 (○) |
|  | Chemical Resistance | ○ | ○ | ○ | ○ | ○ | ○ |

TABLE 2

|  |  | Example 7 | Example 8 | Example 9 | Example 10 | Example 11 | Example 12 |
|---|---|---|---|---|---|---|---|
| Seed Particles | Resin A | A1100 | A1100 | LV430 | LV211 | A3100 | A1100 |
|  | Resin B | 09S53B | 09S53B | 09S53B | 09S53B | 09S53B | HY350 |
|  | Resin A/Resin B (weight ratio) | 40/60 | 60/40 | 40/60 | 40/60 | 20/80 | 40/60 |
| Composite Resin Particles | Seed Particles/PS (weight ratio) | 30/70 | 30/70 | 30/70 | 30/70 | 30/70 | 30/70 |
|  | Flame Retardant (additive amount; parts by weight) | TAIC6B(2.5) | TAIC6B(2.5) | TAIC6B(2.5) | TAIC6B(2.5) | TAIC6B(2.5) | TAIC6B(2.5) |
|  | Flame Retardant Auxiliary Agent (additive amount; parts by weight) | BC(0.5) | BC(0.5) | BC(0.5) | DCP(0.5) | BC(0.5) | BC(0.5) |
| Expanded Molded Article | Adjusting Pressure during Molding MPa | 0.08 | 0.09 | 0.08 | 0.09 | 0.10 | 0.09 |
|  | Density of Expanded Molded Article kg/m$^3$ | 25 | 25 | 25 | 25 | 25 | 25 |
|  | Dimensional Change Rate % (Evaluation) | 1.1 (○) | 1.0 (○) | 1.2 (○) | 1.1 (○) | 1.3 (○) | 1.0 (○) |
|  | Burning speed mm/min. (Evaluation) | 26 (○) | AE (○) | AE (○) | AE (○) | 78 (○) | AE (○) |
|  | Falling Ball Impact Value cm (Evaluation) | 34.5 (○) | 41.5 (○) | 31.5 (○) | 33.5 (○) | 42.5 (○) | 36.5 (○) |
|  | Chemical Resistance | ○ | ○ | ○ | ○ | ○ | ○ |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Seed Particles | Resin A | — | — | — | WD201 | LV115 | LV115 | — | LV115 |
|  | Resin B | F744NP(PP) | NF444A | 09S53B | 09S53B | 09S53B | 09S53B | HY350 | NF444A |
|  | Resin A/Resin B (weight ratio) | — | — | — | 40/60 | 10/90 | 80/20 | — | 40/60 |
| Composite Resin Particles | Seed Particles/PS (weight ratio) | 40/60 | 30/70 | 30/70 | 30/70 | 30/70 | 30/70 | 30/70 | 30/70 |
|  | Flame Retardant (additive amount; parts by weight) | TAIC6B(2.5) | TAIC6B(2.5) | TAIC6B (2.5) | TAIC6B (2.5) | TAIC6B (2.5) | TAIC6B (2.5) | TAIC6B (2.5) | TAIC6B (2.5) |

TABLE 3-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| | Flame Retardant Auxiliary Agent (additive amount; parts by weight) | DCP(0.5) | DCP(0.5) | DCP(0.5) | DCP(0.5) | DCP(0.5) | DCP(0.5) | DCP(0.5) | DCP(0.5) |
| Expanded Molded Article | Adjusting Pressure during Molding MPa | 0.25 | 0.08 | 0.10 | 0.10 | 0.10 | 0.08 | 0.08 | 0.08 |
| | Density of Expanded Molded Article kg/m$^3$ | 25 | 25 | 25 | 25 | 25 | 25 | 25 | 25 |
| | Dimensional Change Rate % (Evaluation) | 0.5 (○) | 3.0 (X) | 0.8 (○) | 1.8 (X) | 0.9 (○) | 1.7 (X) | 0.6 (○) | 2.8 (X) |
| | Burning Speed mm/min. (Evaluation) | AE (○) | 120 (X) | AE (○) | 43 (○) | 100 (X) | AE (○) | AE (○) | AE (○) |
| | Falling Ball Impact Value cm (Evaluation) | 43.5 (○) | 75.5 (○) | 21.5 (X) | 33.5 (○) | 28.5 (Δ) | 38.5 (○) | 21.5 (X) | 66.5 (○) |
| | Chemical Resistance | ○ | ○ | ○ | ○ | ○ | ○ | ○ | ○ |

From the results of Tables 1 to 3, the following can be understood.

From Examples and Comparative Example 1, it can be seen that the use of only the polypropylene in place of the high-density polyethylene requires a high pressure in order to obtain an expanded molded article of a desired expansion ratio.

From Examples and Comparative Example 3, it can be seen that the use of only the high-density polyethylene causes decrease in the falling ball impact value.

From Examples and Comparative Example 4, it can be seen that the copolymer of the alkyl methacrylate ester and ethylene as the ethylene copolymer causes increase in the rate of dimensional change on heating.

From Examples and Comparative Example 5, it can be seen that the excessive high-density polyethylene in the seed particles causes increase in the burning speed.

From Examples and Comparative Example 6, it can be seen that the too few high-density polyethylene in the seed pay titles causes increase in the rate of dimensional change on heating.

From Examples 1, and 6, it can be seen that the higher density of the high-density polyethylene in the seed particles can further decrease the rate of dimensional change on heating.

What is claimed is:

1. High-density polyethylene mixed resin particles used as seed particles during seed polymerization, wherein:
    said seed particles contain a mixed resin of 100 parts by weight of high-density polyethylene and 20 to 100 parts by weight of an ethylene copolymer;
    said high-density polyethylene has a density of 935 to 960 kg/m$^3$ and a softening temperature of 115 to 130° C.;
    said ethylene copolymer is a copolymer of an ester-based monomer selected from an acrylic acid alkyl ester and an aliphatic saturated vinyl monocarboxylic acid, and ethylene, contains 1 to 20% by weight of an ester-based monomer-derived component, and has a softening temperature of 75 to 110° C.;
    said acrylic acid alkyl ester is selected from methyl acrylate and ethyl acrylate; and
    said aliphatic saturated monocarboxylic acid vinyl is selected from vinyl acetate and vinyl propionate.

2. The high-density polyethylene mixed resin particles according to claim 1, wherein said ethylene copolymer has a MFR of 0.2 to 1.0 g/10 minutes and contains 3 to 15% by weight of said ester-based monomer-derived component.

3. Composite resin particles comprising a resin content containing 100 parts by weight of a high-density polyethylene mixed resin derived from said high-density polyethylene mixed resin particles according to claims 1; and 100 to 500 parts by weight of a styrene-based polymer obtained by impregnating and polymerizing a styrene-based monomer in said seed particles.

4. The composite resin particles according to claim 3, wherein said composite resin particles contain 1.5 to 6.0 parts by weight of a flame retardant with respect to 100 parts by weight of said resin content.

5. The composite resin particles according to claim 4, wherein said flame retardant is a halogen-based flame retardant.

6. The composite resin particles according to claim 4, further comprising a flame retardant auxiliary agent, wherein said flame retardant auxiliary agent is selected from dicumyl peroxide, 2,3-dimethyl-2,3-diphenyl butane, 3,4-dimethyl-3,4-diphenyl hexane, and cumene hydroperoxide.

7. Expanded particles obtained by impregnating a blowing agent into the composite resin particles according to claim 3, followed by expanding, the expanded particles having a bulk density of 50 to 15 kg/m$^3$.

8. An expanded molded article obtained by expansion molding the expanded particles according to claim 7.

* * * * *

UNITED STATES PATENT AND TRADEMARK OFFICE
CERTIFICATE OF CORRECTION

PATENT NO. : 9,902,828 B2
APPLICATION NO. : 15/111969
DATED : February 27, 2018
INVENTOR(S) : H. Oowaki et al.

It is certified that error appears in the above-identified patent and that said Letters Patent is hereby corrected as shown below:

Column 22, Line 37 (Claim 3, Line 4), please change "claims 1" to -- claim 1 --.

Signed and Sealed this
Twenty-first Day of August, 2018

Andrei Iancu
*Director of the United States Patent and Trademark Office*